United States Patent
Vance

[11] Patent Number: 6,128,859
[45] Date of Patent: Oct. 10, 2000

[54] MECHANICALLY INTERLOCKED WEATHERSTRIP

[75] Inventor: James Randall Vance, Roanoke, Ind.

[73] Assignee: GenCorp. Inc., Fairlawn, Ohio

[21] Appl. No.: 09/201,991

[22] Filed: Dec. 2, 1998

[51] Int. Cl.[7] .................................................... B60J 1/10
[52] U.S. Cl. ............................................. 49/377; 49/440
[58] Field of Search .......................... 49/440, 377, 490.1, 49/492.1, 493.1, 495.1, 496.1

[56] References Cited

U.S. PATENT DOCUMENTS

| | | | |
|---|---|---|---|
| 3,197,935 | 8/1965 | Clancy et al. | 52/718 |
| 3,638,359 | 2/1972 | Kruschwitz | 49/490 |
| 3,742,649 | 7/1973 | Dochnahl | 49/441 |
| 4,750,781 | 6/1988 | Betteridge | 296/214 |
| 4,949,507 | 8/1990 | Vaughan | 49/482 |
| 5,085,005 | 2/1992 | Yasukawa et al. | 49/377 |
| 5,086,589 | 2/1992 | Dibenedetto | 49/502 |
| 5,174,066 | 12/1992 | Dupuy | 49/502 |
| 5,353,549 | 10/1994 | Henderson et al. | 49/490.1 |
| 5,396,733 | 3/1995 | Dupuy | 49/441 |
| 5,561,003 | 10/1996 | Nowosiadly | 428/99 |

FOREIGN PATENT DOCUMENTS 0 507 231 A2  10/1992  Germany.

*Primary Examiner*—Alvin Chin-Shue
*Assistant Examiner*—Curtis A. Cohen
*Attorney, Agent, or Firm*—Brinks Hofer Gilson & Lione

[57] ABSTRACT

A mechanically interlocked belt type weatherstrip provides a seal between the upper portion of a door and the lower portion a window. The weatherstrip comprises three individual components: a cover, a body and a sealing lip. These components may be either extruded or molded depending particularly upon the configurations of their terminal portions. All of the components may be one of a wide variety of black flexible plastic or elastomeric materials. However, because each of the components is separate, they can be manufactured of different materials and of different colors to provide specifically desired properties. The weatherstrip is formed by snapping the body and the cover together which holds the sealing lip securely in place between the cover and the body. The weatherstrip thus allows versatility of the selection of the separate components to meet the individual style and functional needs of a particular motor vehicle design.

20 Claims, 4 Drawing Sheets

MECHANICALLY INTERLOCKED WEATHERSTRIP

BACKGROUND OF THE INVENTION

The invention relates generally to weatherstrips for motor vehicles and more specifically to a mechanically interlocked weatherstrip for window frames of a motor vehicle.

Most motor vehicles are equipped with movable windows that slide in a window opening from an up or extended position that seals off the opening to a down position, retracted within the vehicle body, that opens all or a portion of the opening and allows an exchange of air between the inside and outside of the vehicle. A sealing device broadly referred to as a weatherstrip is disposed about the periphery of the window opening and provides an air and watertight seal between the vehicle body and the window. The interface between the body and the movable window at the lower extremity of the window opening is typically equipped with a weatherstrip denominated a beltstrip which aesthetically hides the interface and provides a wiper flange or blade for cleaning the window as the window extends and retracts from the body of the vehicle.

Recently, emphasis has been placed upon vehicle streamlining for drag reduction purposes and reduction of wind noise. To achieve these goals, design considerations such as the elimination of all gaps and channels, low profile configurations, overlapping of the beltstrip or weatherstrip on the glass for wind noise reduction, as well as installation ease, serviceability and durability have greatly increased significance. The challenge of achieving such goals depends upon the proper execution of such design considerations.

Beltstrips and weatherstrips are generally extruded or roll-formed in a complicated manufacturing process having many steps. Typically, a core metal structure is formed and coated with an extruded layer of synthetic elastomeric material to form a belt molding and then is then cut to length. A sealing strip having a flexible blade for contacting the window may be formed and coated in an extrusion process with rubber or similar material to form a base strip. An inner surface of the blade is generally flocked to provide a low friction coating for reducing friction between the blade and the window and to reduce the tendency of the weatherstrip and window to squeak. The sealing strip is usually affixed to the belt molding. The belt molding and the base portion of the sealing strip are usually notched at spaced locations. Clips are then inserted into the notches to affix the belt molding, sealing strip and clips. The clips also grip a flange edge formed on the door of the vehicle to hold the belt weatherstrip to the door of the vehicle.

The materials used to form the belt weatherstrip are typically a combination of thermoset elastomer or thermoplastic and thermoplastic elastomer. For example, an elastomer may be over extruded on a metal carrier and then a post assembled laminate strip of cosmetic film and metal that is roll formed into a C-configuration is mechanically fastened over a section of the front surface of the belt weatherstrip.

The requirement of cosmetic surfaces dictates that the surface area be made of specific thermoplastic, a decorative film, or consist of a painted metal while providing a seal to prevent air and water leakage. Conventional weatherstrips lack the flexibility to interchange the front surface in order to provide a different cosmetic appearance.

SUMMARY OF THE INVENTION

A mechanically interlocked belt type weatherstrip provides a seal between the upper portion of a door and the lower portion a window. The weatherstrip comprises two individual components: a cover and a body. These components may be either extruded or molded depending upon the configurations of their terminal portions. Both of the components may be one of a wide variety of black flexible plastic or elastomeric materials. However, because each of the components is separate, they can be manufactured of different materials and of different colors to provide specifically desired properties. The weatherstrip is formed by inserting a portion of the cover into a complementarily formed portion of the body. The weatherstrip thus allows versatility of the selection of the separate components to meet the individual style and functional needs of a particular motor vehicle design.

It is thus an object of the invention to provide a mechanically assembled weatherstrip comprising distinctly separate components.

It is another object of the invention to provide a beltstrip or weatherstrip made by assembling two separate parts.

It is a further object of the invention to provide a beltstrip or weatherstrip having two components which may be made of two distinct materials and thus exhibit distinct properties such as color, gloss and resilience.

These and other aspects and advantages of the invention are described or apparent from the following detailed description of the preferred embodiments and appended drawings wherein like reference numbers refer to the same element, feature or component.

DESCRIPTION OF THE PREFERRED AND ALTERNATE EMBODIMENT

Figure 1:
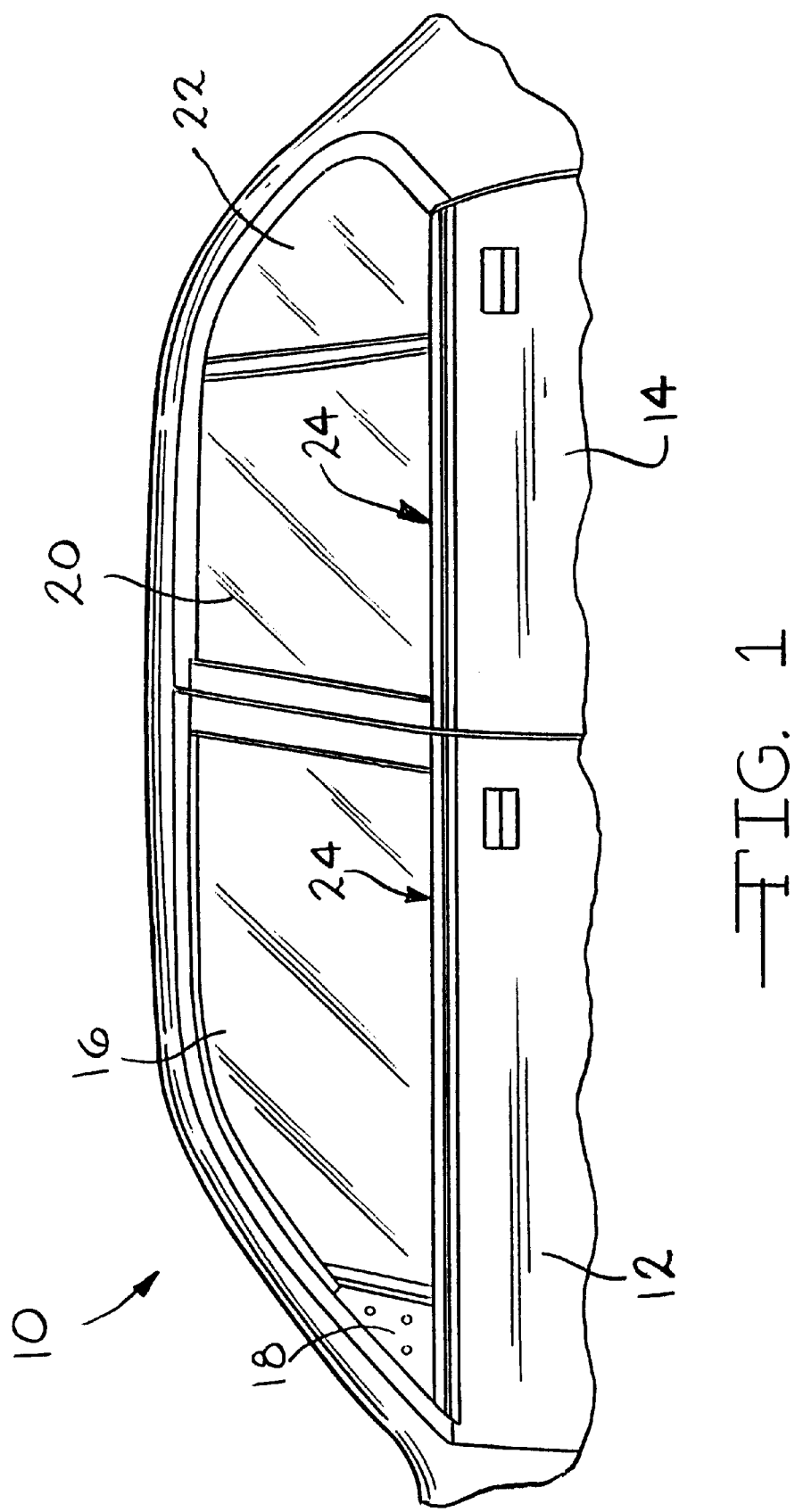
FIG. 1 is a partial side elevational view of a motor vehicle incorporating the present invention.

Turning now to FIG. 1, a partial side elevation of a four-door motor vehicle is illustrated and numerically designated by the reference number 10. The motor vehicle 10 includes a front door 12, a rear door 14, a movable front window 16, a mirror patch 18, a movable rear window 20, a fixed window 22, and a beltstrip or weatherstrip assembly 24 attached to the front door 12 at an interface with the front window 16. A similar beltstrip or weatherstrip assembly 24 may be attached to the rear door 14 at an with the rear window 20. The weatherstrip assembly 24 extends longitudinally along both the lower edge of the front window 16 and the lower edge of the rear window 20 and functions to aesthetically conceal the interface between the front door 12 and the front window 16 and the rear door 14 and the rear window 20, as well as to provide a seal to restrict air and water movement therebetween.

Figure 2:
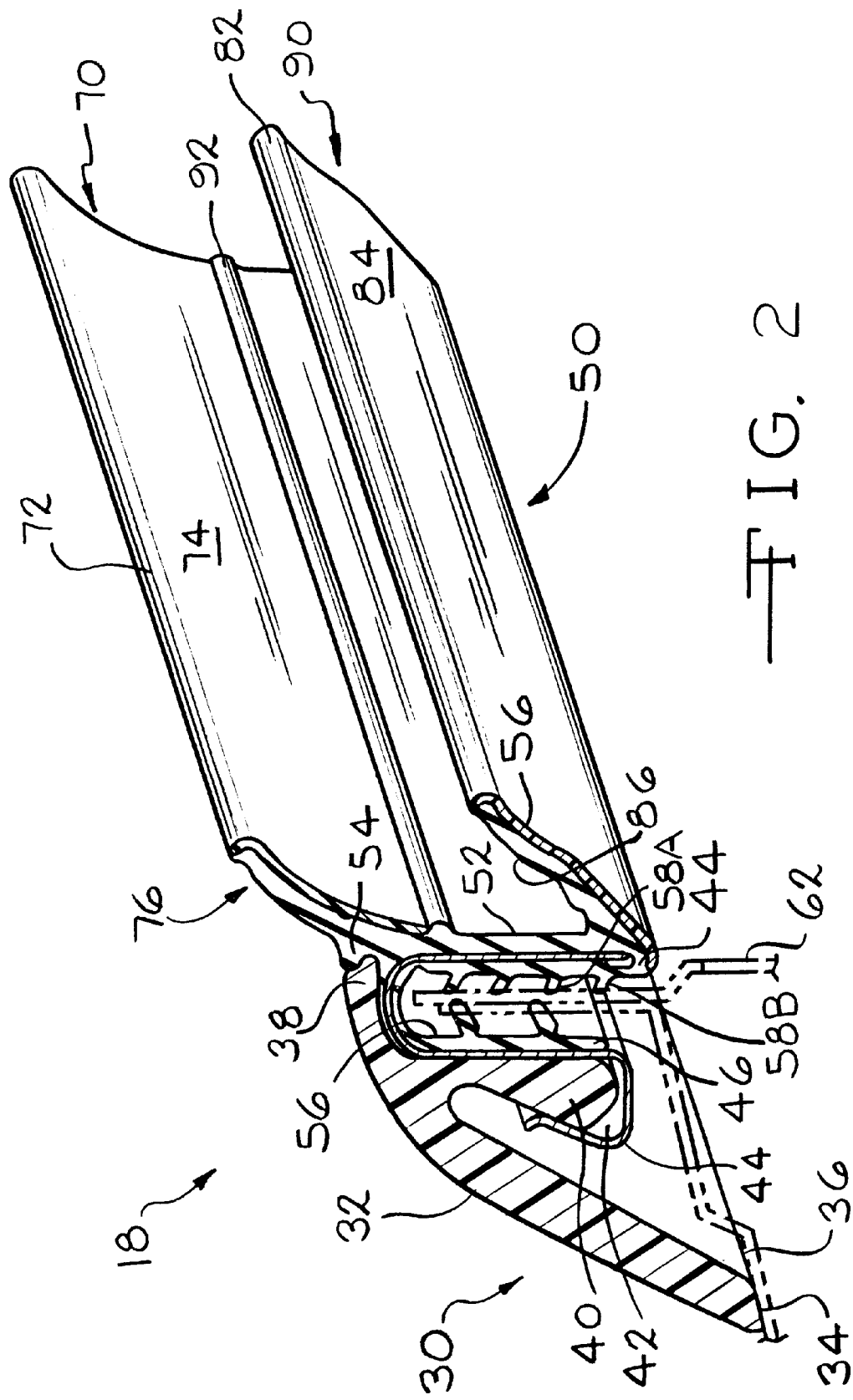
FIG. 2 is a perspective, sectional view of a weatherstrip according to a preferred embodiment of the present invention.
Figure 3:
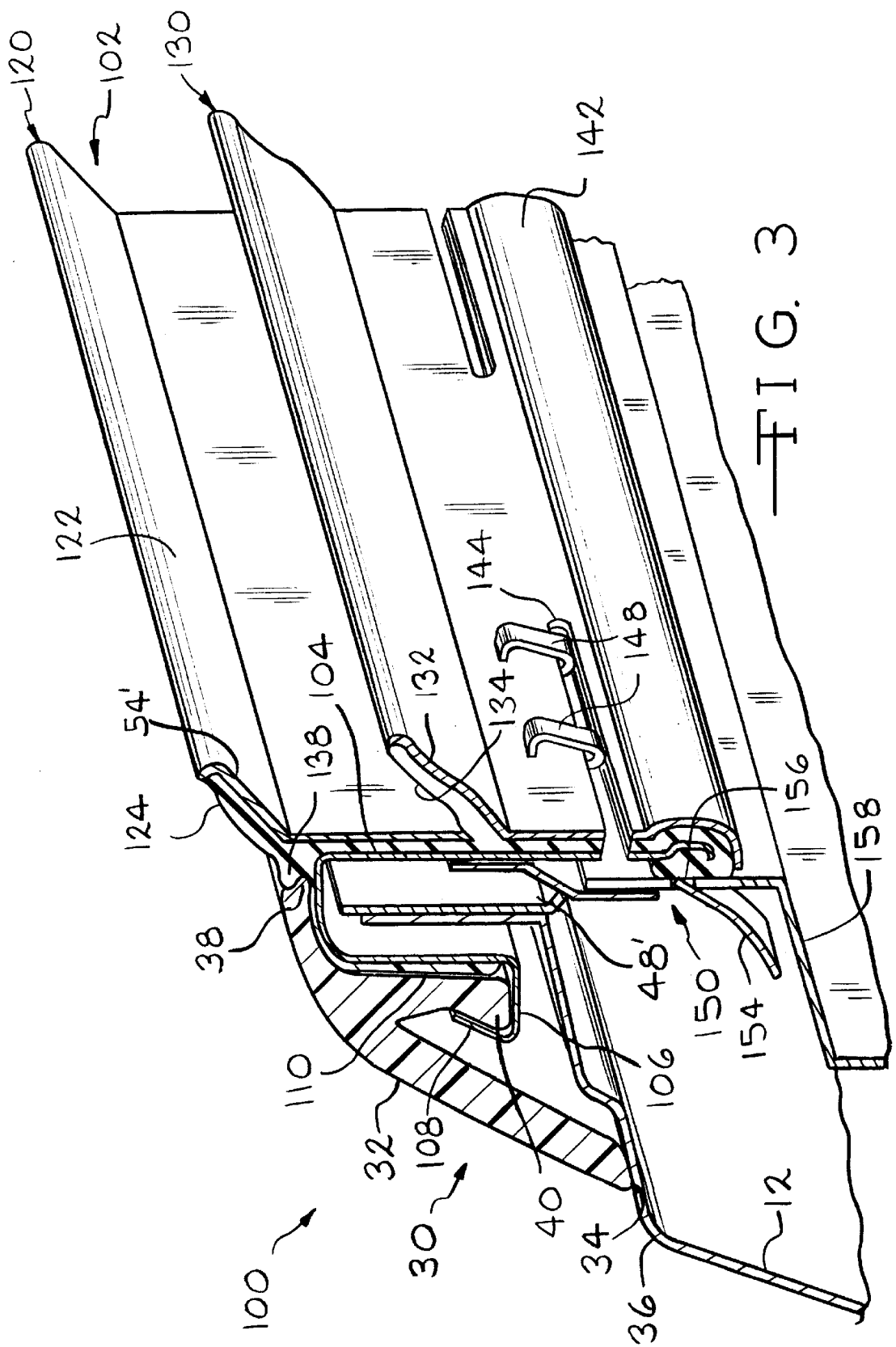
FIG. 3 is a perspective, sectional view of a weatherstrip according to a first alternate embodiment of the present invention.
Figure 4:
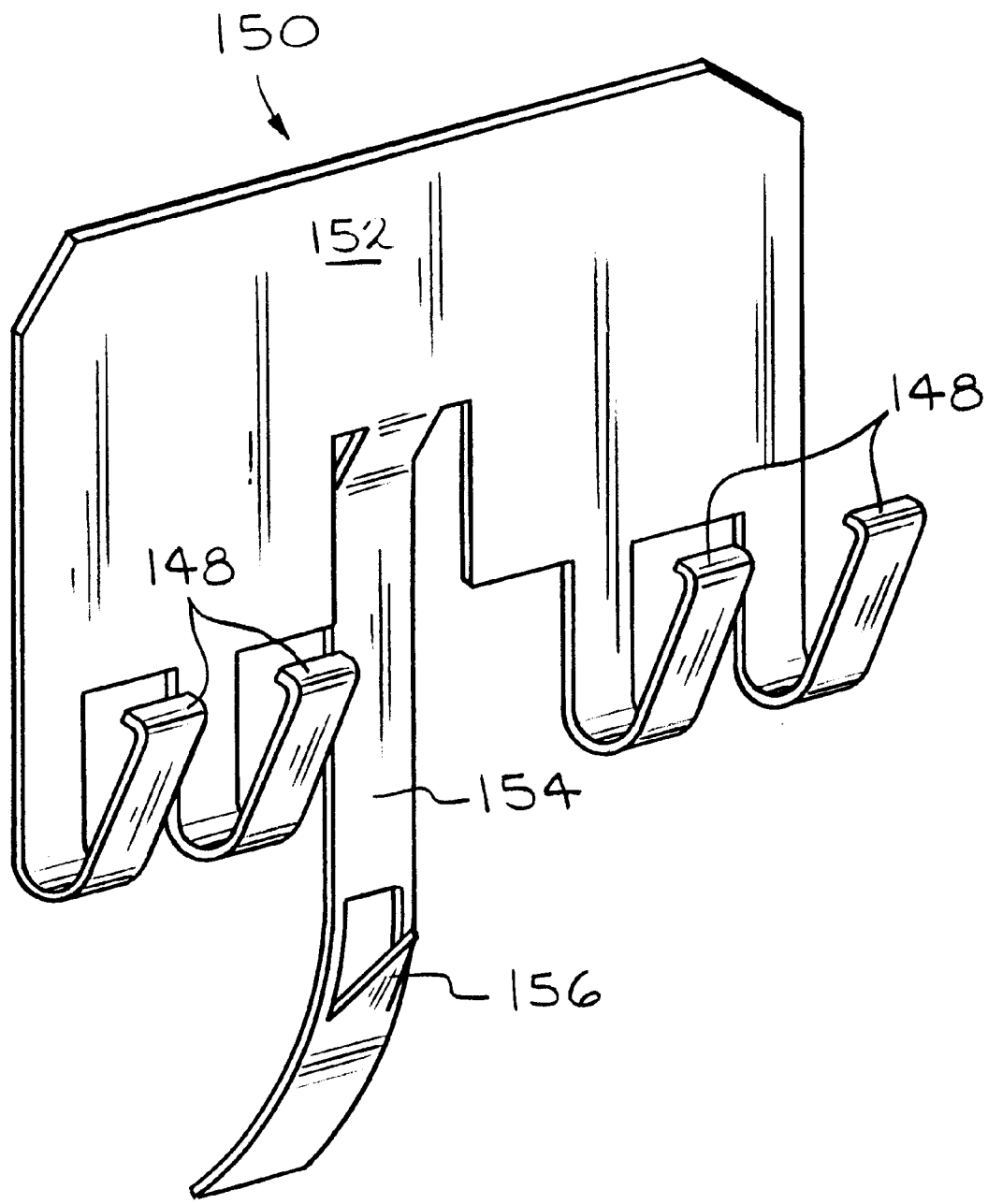
FIG. 4 is a perspective view of a retaining clip according to the first alternate embodiment of the present invention.

The weatherstrip assembly 24 of the invention is shown in FIGS. 2 and 3. The weatherstrip assembly 24 preferably comprises two separate components: a cover 30 and a body 50.

The cover 30 includes an exterior flange or side wall 32 suitable and intended for exposure along the side of a motor vehicle 10 between the lower edge of the windows 16 and 20 and the doors 12 and 14. The side wall 32 terminates in an oblique edge 34. The oblique edge 34 is oriented to lie parallel to and in intimate contact with an exterior portion 36 of the front door 12 or rear door 14. The cover 30 also includes a lower camming projection 38 and a depending bulbous portion 40 having a shape generally complementary to a U-shaped trough 42 defined by a resilient clip portion 44 of an irregular S-shaped metal channel 46 which forms a portion of the body 50.

The cover 30 serves as an outer decorative component made from material to meet color, gloss and weatherability requirements of the individual motor vehicle manufacturer. The cover 30 may be made of a wide variety of materials and may be molded or extruded using a process well-known in the art.

In the preferred embodiment, the cover 30 is made preferably of a colored, weatherable grade, acrylic-styrene-acrylonitrile polycarbonate (ASA/PC) alloy. However, the cover 30 may also be made of combinations of nylon alloy materials, such as ASA, thermoplastic (TPO), polyvinyl chloride (PVC) and the like. Also, the cover 30 may be made of a film laminated thermoplastic material, such as acrylonitrile-butadiene-styrene (ABS), polyethylene teraphthalate (PET) and polybutylene teraphthalate (PBT) and the like. In addition, the cover 30 may be made of body matched painted thermoplastic material from any variety of thermoplastic families based on ABS, PET, PBT, polyamide (nylon) (PA) and the like.

The metal channel 46 is partially encapsulated by the body 50 which includes a central web portion 52 having an upper camming projection 54 and an inverted U-shaped portion 56 disposed in the interior of the metal channel 46. A plurality of opposed oblique fins or fingers 58A are formed in the U-shaped portion 56 and extend generally toward other fingers 58B or the opposite sidewall of the U-shaped portion 56. The fins or fingers 58A and 58B frictionally engage both faces of an upright, welded door frame member 62. In the first preferred embodiment, four fingers 58A extend outwardly from one side and two fingers 58B extend outwardly from the opposite side of the body 50. It should be appreciated that the present invention is not limited by the number of fingers 58A and 58B nor their equal or unequal arrangement on the U-shaped portion 56 and that the invention can be practiced with any sufficient number of fins or fingers 58A and 58B to securely hold the weatherstrip assembly 24 in place.

The body 50 also includes a plurality of sealing lips or flanges 70 and 80 preferably an upper flange 70 and a lower flange 80. Each of the flanges 70 and 80 includes a composite blade portion 72 and 82 having a low-friction, inner sealing surface 74 and 84 and outer surface 76 and 86. The blade portions 72 and 82 and thus the inner surfaces 74 and 84 are preferably made of a low-friction material, such as polyester flock, a low-friction coating, a low-friction film or the like. The outer surfaces 76, 86 may be coated with coating or film or may be uncoated depending on design specifications.

Each of the sealing flanges 70 and 80 is preferably made of a flexible elastomeric material such as rubber, ethylene-propylene-diene-monomer (EPDM), Santoprene® thermoplastic elastomer (TPE) and the like. Santoprene® is a registered trademark of Advanced Elastomer Systems, L. P., of Akron, Ohio. Each of the sealing flanges 70 and 80 may be molded or extruded using a process well-known in the art.

The weatherstrip assembly 24 may also include a projection or rib 92 on its inside surface immediately below the blade portion 72 for reinforcing and providing structural strength to the weatherstrip assembly 24.

In the preferred embodiment of FIG. 2, the central web portion 52 of the body 50 extends longitudinally along and parallel to the front window 16 or the rear window 20 of the vehicle 10.

The body 50 may be made from any inherently dimensionally stable thermoplastic material to meet dimensional stability and exterior motor vehicle requirements. In the preferred embodiment, the body 50 is made from material substantially identical to the cover 30 and may be molded or extruded. However, the body 50 may also be made from PA material, glass filled PA, and the like.

When the weatherstrip assembly 24 is installed on a vehicle 10, the sealing flanges 70 and 80 function as wipers so that when the front window 16 or the rear window 20 is raised, any moisture or other residue on the outside of the window will be wiped away. The sealing flanges 70 and 80 also prevent the ingress of water, moisture or residue into the door panel and reduce the amount of noise transmitted to the interior of the vehicle 10.

It should be appreciated that the invention is not limited to particular geometric configuration or shape of the body 50. It is envisioned that the body 50 can be adapted to a variety of cross-sectional shapes so that the weatherstrip assembly 24 can accommodate and be installed in a wide variety of door configurations and vehicle body styles.

Turning now to FIG. 3, a first alternate embodiment weatherstrip or belt strip assembly 100. The first alternate embodiment weatherstrip or belt strip assembly 100 includes a cover 30 which is in all respects identical to the cover 30 of the preferred embodiment and thus includes an exterior flange or sidewall 32 which terminates in an oblique edge 34 which is configured to lie parallel to and engage an upper exterior portion 36 of the front door 12 or the rear door 14. The cover 30 also includes a lower camming projection 38 and a depending, bulbous portion 40. The first alternate embodiment belt or weatherstrip assembly 100 also includes a body 102 which is similar though larger and more complex than the body 50 of the preferred embodiment weatherstrip assembly 24. As such, it includes a generally S-shaped, complexly curved metal channel 104 to which a portion of the body 102 is secured to and preferably integrally molded to. The S-shaped channel includes a U-shaped trough 106 which receives and tightly retains the bulbous portion 40 of the body 30. Retention is assured by an oblique terminal portion 108 of the metal channel 46 which defines a narrow throat 110 which receives complementarily configured regions of the bulbous portion 40.

The body 102 also includes an upper sealing lip or flange 120 and a lower sealing lip or flange 130. Each of the sealing flanges 120 and 130 are composite structures having a low friction inner sealing surface 122 and 132 secured to the associated blade portions 124 and 134 extending from the body 102. The low friction inner sealing surfaces 122 and 132 are preferably made of a low-friction material such as polyester flock, a low-friction coating, a low friction film or the like. If desired, the outer surfaces of the blade portion 124 and 134 may be coated with a coating or film or may be left uncoated.

The body 102 includes an upper camming projection 138 which is complementary to and is disposed in adjacent engagement with the first camming projection 38 on the cover 30. The body 102 also includes a rolled lower edge 142 which continues the three layer configuration of the metal channel 104, the body 102 and the low friction material 132. A plurality of spaced apart, elongate apertures 144 extend through the body 102, the metal channel 104 and the flocking 134 in a region just above the rolled edge 142. The apertures 144 receive prongs 146 of a metal retaining clip 150.

The retaining clip 150 includes a central body portion 152 and a centrally disposed retaining member 154 having a barb 156 which engages an interior panel 158 of the vehicle door 12 or 14. The clip also includes a plurality, preferably four, but at least two prongs 148 which extend through the apertures 144 and may be folded to the position illustrated in FIG. 3 in order to facilitate retention of the first alternate embodiment weatherstrip assembly 100 upon the doors 12 and 14 of a vehicle. Depending upon the desired retention characteristics, the door panel 158 may include slots or apertures 160 which receive the barbs 156 of the retainer clips 150 thereby providing more secure retention of the belt strip assembly 100. Again, the body 102 and each of the blade portions 124 and 134 of the flanges 120 and 130 are preferably made of flexible elastomeric material such as rubber, ethylene-propylene-diene-monomer (EPDM), Santoprene®, thermal plastic elastomer (TPE) and the like. Santoprene® is a registered trademark of Advanced Elastomer Systems, L.P., of Akron, Ohio.

The foregoing disclosure is the best mode devised by the inventor for practicing this invention. It is apparent, however, that apparatus incorporating modifications and variations will be obvious to one skilled in the art of weatherstrip assembly. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A belt strip for a motor vehicle comprising, in combination,
    a cover including a first camming projection, a flange extending generally away from said first camming projection and adapted to engage an exterior portion of a vehicle door, an exterior surface defined at least partially by said flange, an interior surface and a bulbous projection extending away from said interior surface, and
    a body including a second camming projection, at least one sealing lip and a gripping channel adapted to receive said bulbous projection,
    wherein said first camming projection of said cover is disposed adjacent and in contact with said second camming projection of said body and said bulbous projection is disposed in said gripping channel.

2. The belt strip of claim 1 further including flocking disposed on said sealing lip.

3. The belt strip of claim 1 further including a second sealing lip disposed parallel to and spaced from said at least one sealing lip.

4. The belt strip of claim 3 wherein both of said sealing lips includes flocking.

5. The belt strip of claim 1 wherein said flange includes an oblique terminal surface adapted to conform to a surface of a motor vehicle door.

6. The belt strip of claim 1 wherein said body further includes a plurality of opposed webs adapted to engage a panel of a motor vehicle door.

7. The belt strip of claim 1 further including an S-shaped metal insert defining said gripping channel.

8. The belt strip of claim 1 further including a S-shaped metal insert and wherein said body is formed on said insert.

9. The belt strip of claim 8 further including a plurality of opposed webs disposed within a channel defined by said S-shaped insert.

10. A belt strip for a motor vehicle comprising, in combination,
    a cover including a first camming projection, a flange extending generally away from said first camming projection and adapted to engage an exterior portion of a vehicle door, an exterior surface defined at least partially by said flange, a surface opposite, said exterior surface and a bulbous projection extending away from said surface opposite said exterior surface, and
    a body including a second camming projection, at least one sealing lip and an S-shaped insert defining a gripping channel adapted to receive said bulbous projection,
    wherein said first camming projection of said cover is disposed adjacent and in contact with said second camming projection of said body and said bulbous projection is disposed in said gripping channel.

11. The belt strip of claim 10 wherein said S-shaped insert is metal.

12. The belt strip of claim 10 further including flocking on said sealing lip.

13. The belt strip of claim 10 wherein said body further includes a plurality of opposed webs adapted to engage a panel of a motor vehicle door.

14. The belt strip of claim 10 further including a second sealing lip disposed parallel to and spaced from said at least one of sealing lip.

15. The belt strip of claim 10 wherein said flange inches an oblique terminal surface adapted to conform to a surface of a motor vehicle door.

16. A belt strip for a motor vehicle comprising, in combination,
    a cover including a first camming projection, a flange extending generally away from said first camming projection and adapted to engage an exterior portion of a vehicle door, an exterior surface defined at least partially by said flange and a bulbous projection extending away from said exterior surface, and
    a body including a second camming projection, a pair of spaced apart parallel sealing lips and a sinuous insert defining a channel adapted to receive said bulbous projection,
    wherein said first camming projection of said cover is disposed adjacent and in contact with said second camming projection of said body and said bulbous projection is disposed in said channel.

17. The belt strip of claim 16 wherein said sinuous insert is metal and S-shaped in cross section.

18. The belt strip of claim 16 further including flocking on said sealing lips.

19. The belt strip of claim 16 wherein said body further includes a plurality of opposed webs adapted to engage a panel of a motor vehicle door.

20. The belt strip of claim 16 wherein said flange includes an oblique terminal surface adapted to conform to a surface of a motor vehicle door.

* * * * *